United States Patent Office 3,258,404
Patented June 28, 1966

3,258,404
METHOD OF PERFORMING A RADIATION-INDUCED CHEMICAL REACTION
Robert R. Hentz, Pennington, N.J., assignor to Socony Mobil Oil Company, Inc., a corporation of New York
No Drawing. Filed Sept. 14, 1962, Ser. No. 223,832
1 Claim. (Cl. 176—39)

This invention relates to a method of carrying out chemical reactions by means of high energy radiations, and particularly to reactions in the presence of a solid contact material which may or may not have catalytic activity.

Radiation-induced chemical reactions in the presence of a solid are of interest because of the possibility that the efficiency or the selectivity of reactions may be increased by the presence of the solid. A further point of interest is that they can occur at very low temperatures, with results that may differ markedly from those of conventional thermal or thermal-catalytic reactions which are run at higher temperatures.

In one line of effort, increased catalytic activity has been sought by pre-irradiation of the catalyst, and the induction of catalytic activity in a solid by pre-irradiation has also been attempted, but it has generally been found that the radiation-induced physical changes thus established in the catalyst or solid, and believed to be responsible for changes in catalytic activity, tend to anneal out rapidly at the elevated temperatures required for most reactions of interest.

Other efforts have been devoted to the simultaneous irradiation of both reactants and solid under desired experimental conditions by placing the reactants-solid system in the thermal neutron flux of a nuclear reactor. In this case, fission fragments from fissionable material associated with the solid are responsible for the chemical effects, and the generation of fission fragments takes place only so long as the system is exposed to the thermal neutron irradiation. As is apparent, this line of endeavor adaptation to a nuclear or chemonuclear reactor and raises formidable problems of contamination. Similar experiments have involved the use of the radiation effects of prompt alpha particles or other nuclear particles which are produced only while the system is under irradiation in a reactor or other source of particles.

The invention herein described is an improvement over the transitory, difficult, and often inconvenient procedures noted above. In brief outline, the invention proposes a method of performing a radiation-induced chemical reaction in the presence of a solid contact material which comprises first forming the contact material with an element having an abundant isotope of large thermal neutron activation cross section and capable of being activated to a state of radioactivity. The next steps comprise subjecting the contact material to a thermal neutron flux to activate the said isotope so as to induce radioactivity therein, then removing the activated material to a conventional reaction zone, where it emits radiation, and contacting the same with a chemical reactant to convert the reactant to a product by the aid of said radiation, and separating and recovering the product.

The solid contact material may be a catalyst for a given reaction, or a non-catalyst. If a non-catalyst, it may act to transfer radiation energy to the reactant, thus serving as an internal source of radiation to effect a chemical reaction; in other words, the reactant-contact material system is a self-irradiated one. For example, the fixation of nitrogen may be brought about by mixing the irradiated solid with mixtures of nitrogen and oxygen, either in the presence or absence of nitrogen oxides, and varying the pressure up to 50 atmospheres and the temperature up to 200 or 300° C. If the contact material is a catalyst, it may not only act to catalyze the reaction but also to transfer radiation energy to it, as in the case of the non-catalytic contact material. As an example, petroleum hydrocarbons may be cracked in the presence of cracking catalysts at temperatures below those used in thermal cracking.

Considering the invention in greater detail, and in a more or less orderly way, the contact material is an inorganic material which is relatively stable and does not disintegrate as a result of neutron exposure and radioactivity occurring therein and which is capable of retaining its form and strength under the conditions of its use. In general, the material should have a relatively low thermal neutron capture cross-section, below about 10 barns and preferably below 0.5 barn. The material is porous, having a surface area broadly within the range of 5 to 1,500 square meters per gram and preferably 50 to 700 square meters per gram. As is known, these high surface areas are the result of an internal effect, rather than merely the state of subdivision, and more particularly arise from the presence in the solids of numerous pores or micropores. The pore volume should be within the range of 5 to 70% and preferably 30 to 50%. The pore radii may range from about 4 angstroms to 100 microns. Microporous contact materials are preferred, the term "microporous" referring to porous, solid materials having at least 5% of their volume as pores and at least 25% of the total pore volume comprising pores having radii less than 100 angstroms.

Specific solids include silica, silica gel, alumina, silica-alumina, oxides of calcium, barium, nickel, iron, and the like. Gel-type solids are useful, as obtained by drying hydrated oxides such as alumina, silica, titania, zirconia, magnesia, and zinc aluminate. Also useful are the zeolites, both natural and synthetic, and including those zeolites which act as molecular sieves, having pores of uniform and generally very small size, say about 5 to 20 angstroms. Examples are chabazite and analcite, although there are many others, all of which are conventional. Ion exchange forms of zeolites are suitable. Other useful solids are siliceous earths such as diatomaceous earth, infusorial earth and kieselguhr; natural clays and clay-like materials such as kaolin and montmorillonite clays, bentonite, fuller's earth, Superfiltrol, bauxite and Porocel; porous ceramic materials such as unglazed porcelain; aluminum silicate selective adsorbents such as calcium aluminum silicate; chamotte; asbestos; pumice; talc; activated carbon, bone char, charcoal, graphite; hydrosilicates, particularly those of aluminum.

As examples of catalysts and supports therefore, and reactions for which they are useful, there may be noted: Mixtures of silica with alumina, zirconia or magnesia, or composites of silica-alumina with magnesia, thoria or zirconia, for the catalytic cracking of hydrocarbons; chromia or molybdena on alumina, or cogelled chromia-alumina or molybdena-alumina for dehydrogenation and reforming of hydrocarbons; platinum or nickel on alumina containing small amounts of halogens or on silica gel for isomerization of hydrocarbons; chromia on alumina or on silica-alumina gels for dealkylation of alkyl aromatic hydrocarbons; mixtures of iron oxide with chromia and potassium oxide on alumina for dehydrogenation of ethyl benzene to styrene; vanadium oxide on asbestos for oxidations such as that of naphthalene to phthalic anhydride, or of sulfur dioxide to trioxide; mixtures of copper and zinc on silica or alumina for the dehydrogenation of alcohols; and silver on pumice for dehydrogenation of alcohols, such as the conversion of methanol to formaldehyde. When the catalytically active metal or metal compound constituent of the carrier has a relatively high neutron capture cross-section, its concentration in the carrier is restricted to a level, usually below one percent, at which it will not seriously interfere with the neutron efficiency of the system.

In general, although the solid is described as an inorganic material, this designation is employed in a sense sufficiently broad to cover activated carbon, graphite, charcoal and bone chars which are essentially carbon, even though in some cases they may contain small amounts of hydrogen.

The properties of porosity and surface area may be obtained by means of conventional processing of the solids, such as calcining, chemical treatment, controlled precipitation rate and the like. In this connection, the utility of the solids is not affected by conventional pretreatments, such as the foregoing, and including heating for lengthy periods in oxidizing or reducing atmospheres.

The element to be incorporated in the contact material will contain the abundant isotope of large thermal neutron activation cross section, conventionally designated a nuclide. Prior to activation, it is a stable nuclide, but after activation it is a radioactive nuclide or a radionuclide. Chemically, the element or nuclide may be in the elemental form, or as a salt or other compound thereof, and may be impregnated on the contact material or incorporated during the synthesis or preparation of the latter, as will be described. The concentration of the nuclide in the contact material should be large enough to produce a desired effect when the activated material is subsequently used; for most purposes the concentration in terms of the element with the stable nuclide should be at least 1%, and may range to 5%, 10%, or 25% by weight, or more. It may also be as low as 0.1% by weight. As will be understood, the nuclide is not radioactive but is capable of becoming radioactive when activated by a suitable thermal neutron flux, for which it has a large cross section, suitably at least 1 barn and preferably at least 5 or 10 barns. The abundance of the nuclide is at least 0.1%, but preferably at least 1 or 2%, and of course it can be as high as 50 or 100%. Suitable nuclides include thulium-169, lutetium-176, thallium-203, cobalt-59, selenium-74, indium-113, cesium-133, samarium-152, terbium-159, ytterbium-168, ytterbium-174, hafnium-180, tantalum-181, rhenium-185, rhenium-187, iridium-191, iridium-193, mercury-202. Preferred nuclides are those which on activation yield radioactive isotopes that emit purely beta radiation, such as thulium-169, lutetium-176, thallium-203, and rhenium-185. Thulium-169, for example, has an abundance of 100%, and a thermal neutron activation cross section of about $130\pm30$ barns; its radioactive isotope, thulium-170, has a suitable half life of about 129 days and emits only beta radiation, the maximum energy of which is about 0.98 mev. Lutetium-176 is characterized by having a thermal neutron cross section of about $4,000\pm800$ barns and on activation gives a purely beta-emitting radioactive isotope whose radiation energy is about 0.47 mev. Thallium-203 gives a radioactive isotope of a half life of 2.7 years which emits beta radiation of 0.87 mev. energy. Rhenium-185 has an abundance of 37% and may be transformed into a radionuclide of about 4 days half life which emits only beta radiation of 1.07 mev. Other properties of these and other nuclides are set forth in the table below. It will be understood that two or more nuclides may be present in the contact material.

Formation of the nuclide-containing contact material may be done in any convenient way, as by impregnating preformed contact material with a compound of the element (for convenience hereinafter referred to as the "element compound") having the abundant nuclide or isotope, or by synthesis or preparation of the contact material using the said element compound. As many of the contact materials noted above are of natural occurrence, or are available as preformed synthetic materials, conventional impregnation is a suitable method, using the element compound as the impregnant, preferably in solution form. Alternatively, such compound in powdered form may be mixed with the powdered contact material and the mixture pressed into suitable forms.

Synthesis of the nuclide-containing contact material, such as a silica-based hydrogel, may be carried out by preparing colloidal solutions of the various components followed by cogelling to form particles, according to the general method disclosed in U.S. Patent 2,384,946. If desired, the element compound may be mixed as a powder rather than a colloidal solution.

The resulting nuclide-contact material system is then activated by exposure for a given time to the thermal neutron flux of a nuclear reactor, as by placing the material in one or more beam tubes of suitable size in a full scale reactor. The neutron flux may conveniently range from $10^{11}$ neutrons/sq. cm./sec. to any desirable upper limit, and the exposure time from several days to several years, preferably for at least 13 days. At these flux values and exposure times the system becomes suitably activated, and of course emits radiations itself which, immediately after the conclusion of the neutron exposure, may vary from 0.01 to 100, preferably 0.1 to 50 megarads/hr., these values being at least sufficient to enable the system to produce measurable radiation-chemical changes. The activated system has a specific activity, or rate at which it emits charged particles, of 0.02 to 200, preferably 0.2 to 100, curies/gram of system. At the end of one half life of the radionuclide, the emitted dose rate and specific activity values would be only half of the values obtaining immediately after exposure to the neutron flux.

Activation of the system transforms the original stable inactive nuclide into a radionuclide, which then undergoes the process of radioactive decay, that is, it emits charged particles or radiation. For example, the stable nuclide, thulium-169, is transformed to the radionuclide, thulium-170, which emits beta radiation having an energy of 0.98 mev.; this radiation is not only emitted by the system but also is absorbed by it, as described below. Thulium-170 has a half life of 129 days, and thus will emit useful radiation for a period of many months, after which the system incorporating it may be reactivated in the nuclear reactor, preferably after addition of fresh amounts of stable nuclide. After decay of a radionuclide, another element is formed, and this simply remains in the system, although it may have value as a catalytic material for some chemical reactions and it may also aid in the transfer of energy from the contact material to the reactant.

The nature or kind of emitted radiation will depend on the radionuclide, and in turn on the original stable nuclide. While the latter may be chosen to secure various kinds of radiation, it is preferred to use stable nuclides which yield purely beta-emitting radionuclides, preferably those having a half life of several months. The beta emission may be electrons or positrons. Because of the comparatively short range of beta particles, substantially all of their energy is absorbed within the reactant-contact material system, which in effect comprises a self-irradiating system; thus, loss of energy is reduced and a much higher efficiency of energy absorption and utilization is obtained. Furthermore, radiation hazard is greatly decreased; only the associated bremsstrahlung of a beta emitter would penetrate the walls of a standard steel storage vessel or chemical reactor, and provision for this effect can be made by allowing a small distance and/or some shielding, as the bremsstrahlung energy associated with 1 mev. electrons is only about 0.1%. Aside from this, only conventional standard equipment is necessary for the radiation-induced chemical reaction and the resulting reaction mixture may be handled by conventional methods and equipment.

As will be understood, other emitted radiations are useful, including gamma and X-rays, and electrons and positrons, and appropriate stable nuclides are available for obtaining emitters of these radiations, examples of which appear below in the table. Also useful are emitters which yield one kind of radiation followed by one or more other kinds.

The following table lists some stable nuclides which are useful, giving chemical symbol and mass number of each together with their abundance and thermal neutron cross section (Sigma). The latter quantity is given as an average value. Also listed are the half lives (T) and radiations of the radionuclides formed from the nuclides. In each case the radionuclide has a mass number one unit greater than that of the stable nuclide. As to the other notation, y. stands for years, d. for days, h. for hours, e. for electron and IT for isomeric transition. As is apparent, the half life T may vary widely; ordinarily it should be at least 10 hours but for some purposes may be less; preferably it is at least 4 or 5 days, and more preferably several months. In column (5) the figures in parentheses represent maximum beta energies in mev., only a few such values being given by way of illustration, although generally speaking the radiation energy may range both lower and higher than the values noted; for example, it may be 0.1 mev., or less, and may be 1, 2, or more mev. Energies of 0.4 mev. and up are preferred. In column (5) "beta" stands for beta particles and "gamma" for gamma radiation.

TABLE

| (1) Nuclide | (2) Percent Abundance | (3) Sigma | (4) T | (5) Radiations |
|---|---|---|---|---|
| Tm-169 | 100 | 130 | 129 d | beta (0.98). |
| Lu-176 | 2.6 | 4,000 | 6.8 d | beta (0.47). |
| Tl-203 | 29.5 | 8 | 2.7 y | beta (0.87). |
| Co-59 | 100 | 20 | 5.3 y | beta, gamma. |
| Se-74 | 0.87 | 26 | 123 d | gamma, e. |
| In-113 | 4.23 | 56 | 49 d | e, beta, IT(0.19). |
| Cs-133 | 100 | 26 | 2.3 y | e, beta, gamma. |
| Sm-152 | 26.63 | 140 | 47 h | e, beta, gamma. |
| Tb-159 | 100 | >22 | 73 d | e, beta, gamma. |
| Yb-168 | 0.14 | 11,000 | 32 d | gamma. |
| Yb-174 | 31.84 | 60 | 101 h | beta, gamma. |
| Hf-180 | 35.44 | 10 | 46 d | e, beta, gamma. |
| Ta-181 | 100 | 19 | 111 d | e, beta, gamma. |
| Re-185 | 37.07 | 100 | 92 h | beta (1.07). |
| Re-187 | 62.93 | 75 | 18 h | e, beta, gamma. |
| Ir-191 | 38.5 | 700 | 74 d | e, beta, gamma. |
| Ir-193 | 61.5 | 130 | 19 h | beta, gamma. |
| Hg-202 | 29.8 | 3.8 | 47 d | e, beta, gamma. |

In broad outline, the method of the invention comprises selecting a desired contact material, forming it with a desired stable nuclide, activating the resulting solid system with neutrons in a nuclear reactor for a given time, then transferring the radioactive mass to a conventional reactor, introducing desired reactant or reactants, either in the gaseous or liquid phase, thereto and in direct contact with the mass, providing desired reaction conditions in respect of pressure, temperature, time and the like, separating product and unchanged reactant at the conclusion of the chemical reaction, and recovering the product. The solid radioactive contact material may be cleaned and restored to its original condition for the next chemical reaction, and when its radioactivity has fallen off, it may be reactivated in the nuclear reactor. A cyclic process may thus be employed comprising the foregoing steps.

The radioactive contact materials are useful for promoting a wide variety of chemical reactions. By appropriate combinations of contact materials, reactants, and conditions, selectivity may be obtained. The selectivity may be increased by adding to the contact material a component or catalyst which conventionally is a catalyst for a particular reaction, thus securing a catalytic effect as well as the effect of the energy transferred from the radioactive nuclide of the contact material. In the foregoing ways, reactions such as alkylation, aromatization, cracking, dealkylation, dearomatization, isomerization, polymerization, and the like may be carried out, as well as the catalytic and thermal reactions described above.

More particularly, the following illustrative reactions may suitably be performed by the method of the invention:

Non-hydrogenative cracking of petroleum hydrocarbons, particularly those boiling above gasoline, over solid acid oxide catalysts like silica, alumina, magnesia, titania, boria, and mixtures thereof like silica-alumina. Usual conversion conditions are temperatures of 400 to 1200° F., pressures of atmospheric to 500 p.s.i.g. and space velocities of 0.05 to 40 v./v./hr. (volumes of liquid feed per volume of contact material per hour).

Isomerization of paraffins and cycloparaffins over alumina or silica-alumina at temperatures of 200 to 1000° F., pressures of atmospheric to 1000 p.s.i.g., and space velocities of 0.05 to 40.

Dehydrogenation of hydrocarbons, for example, the dehydrogenation of butane to butylenes, of naphthenes to aromatics, or of paraffinic hydrocarbons in the gasoline boiling range to olefinic hydrocarbons, over platinum or chromia on alumina containing halogen, or over platinum or chromia on silica-alumina, at temperatures of 200 to 1000° F., pressures of 0 to 500 p.s.i.g., and space velocities of 0.1 to 30.

Alkylation of isoparaffin-olefin mixtures over molybdena on silica-alumina gel, or sulfate-impregnated zirconia gel, at temperatures up to 800° F. and pressures up to 1000 p.s.i.

Reactions wherein a carbon-hydrogen, carbon-carbon, or other chemical bond is ruptured with resultant formation of molecular fragments which recombine to form dimers; for example, the conversion of methanol to diethylene glycol over porous contact material composed of pumice, kieselguhr, diatomaceous earth or silica gel. Temperatures may be of the order of 50 to 200° F., and pressures may range from atmospheric to 200 p.s.i.g.

The conversion of nitrogen and oxygen to nitrogen oxides at 200 to 400° F. and 5 to 20 atmospheres in the presence of silica gel.

Dealkylation of alkylated aromatics, such as isopropylbenzene, over silica-alumina at room temperatures and higher and at atmospheric and superatmospheric pressures.

The polymerization of olefins, such as isobutene and other monomers, over silica, alumina, magnesia, or zinc oxide at room temperatures or below.

In general, conversions are preferred in which carbon-to-carbon or carbon-to-hydrogen bonds, or both are affected.

In a typical experiment, thulium nitrate in aqueous solution is used to impregnate a conventional microporous silica-alumina cracking catalyst. The latter may contain about 13% alumina, the balance silica, and may suitably be in the form of pellets of 1/8 to 1/4 inch diameter having a surface area of about 500 sq. meters/gram, a pore volume of about 35%, and pore radii in the range of 20 to 150 angstroms. Impregnation is accomplished by soaking the catalyst in the solution, after which the material is heated to decompose the salt and drive off oxides of nitrogen as well as water. The amount of thulium (100% thulium-169) on the silica-alumina is about 10% by weight. The resulting contact material is made radioactive by exposure to a thermal neutron flux of $10^{12}$ neutrons/sq. cm./sec. for about 31 days in a nuclear reactor. Suitably, the contact material may be disposed in a beam tube in the reactor during the irradiation. The activated contact material is then removed from the nuclear reactor to a conventional chemical processing reactor where it is contacted with the hydrocarbon feed stock comprising a virgin paraffinic gas oil or a constituent thereof at a temperature of at least 100° F. and atmospheric pressure or greater for a sufficient time to effect a conversion. The cracked products comprise material in the gasoline boiling range and is valuable for its content of branched hydrocarbons.

It may now be seen that the invention provides worthwhile advantages in the conduct of radiation-induced chemical reactions in the presence of solid contact material. Thus, it is not necessary to adapt the reactant-contact material system to the characteristics of a radiation facility, which are usually predesigned, or to design a radiation facility for a particular system. Only the contact material need be activated in the nuclear reactor or other source of neutrons, and after removal of a chemical reaction zone, it may be used to effect a number of chemical reactions which may be the same or different. If each of these reactions were run in a radiation facility, such as a cobalt-60 source, as by exposing the reactant to the radiation in the usual way, i.e., using shielding and remote control handling, the task would be tediously long and inconvenient, as may be apparent.

If the facility were a chemonuclear reactor, wherein high energy fission fragments are used to promote a chemical reaction, similar problems would be present. Thus, the fission fragments, being very radioactive, would require remote control processing for their removal from the chemical reaction mixture. Disposal of radioactive waste products would be necessary, as by means of storage tanks for decay processes, or equipment for removing or neutralizing radioactivity as by ion exchange, absorption, distillation, and the like. Also, introduction of the reaction mixture into the reactor would involve changing the neutron flux and raise problems of reactor control.

There is no radiation hazard in the preparation of the nuclide-contact material system, because the system is first prepared by standard procedures and equipment and then activated.

The chemical reaction can be run in a conventional chemical reactor using the methods of catalytic chemistry with the advantages of the milder conditions afforded by the use of radiation energy. Furthermore, the reaction rate is increased over that of the corresponding conventional catalytic reactions.

The use of the nuclide-contact material system has wide applicability inasmuch as the internal source of radiation in this system is independent of any catalytic effects it may have and of any particular reaction. Thus, the internal source of radiation may be used with any conventional contact material, with or without the addition of conventional catalysts or promoters, and for any suitable reaction In particular, the use of nuclides giving purely beta-emitting radionuclides is of importance in providing systems characterized by substantially complete absorption of radiation energy with the advantages of increased efficiency and safety.

It will be understood that the invention is capable of obvious variations without departing from its scope.

In the light of the foregoing descriptions, the following is claimed.

I claim:

In a method of performing a chemical reaction in the presence of a solid contact material, the improvements which comprise impregnating a contact material with 1 to 25% by weight of an element with a stable inactive nuclide having an abundance of at least 2% and a thermal neutron activation cross-section of at least 50 barns, said contact material being a porous inorganic radiation-resistant solid having a surface area of 5 to 1500 sq. m./g., a pore volume of 5 to 70%, and a low thermal activation cross-section, said nuclide being further characterized by yielding, upon thermal neutron activation, a radionuclide which emits purely beta radiation of at least 0.4 mev. energy, which has a half life of about 4 days and greater, and which is selected from the group consisting of thulium-169, lutetium-176 and rhenium-185, subjecting the impregnated material to a thermal neutron flux of at least $10^{11}$ neutrons/sq. cm./sec. to activate said nuclide to produce said radionuclide, then removing the activated material from said flux to a conventional chemical reaction zone where it emits beta radiation at a dose rate of 0.01 to 100 megarads/hr., said activated material having a specific gravity of 0.2 to 200 curries/g., contacting the activated material in said zone with a reactant which is characterized by having carbon-containing bonds comprising carbon-to-carbon and carbon-to-hydrogen bonds, converting the reactant to a product by aid of said radiation while coincidently absorbing substantially all of said radiation in the activated material-reactant system, said conversion step affecting only said carbon-to-carbon and carbon-to-hydrogen of said carbon-containing bonds and separating and recovering said product.

References Cited by the Examiner

UNITED STATES PATENTS

| | | | |
|---|---|---|---|
| 1,400,203 | 12/1921 | Backhaus | 252—454 |
| 1,655,184 | 1/1928 | Hahn | 252—301.1 |
| 2,554,476 | 5/1951 | Werner | 252—301.1 |
| 2,579,243 | 12/1951 | Reid | 176—11 |
| 2,698,290 | 12/1954 | Seaborg et al. | 176—11 |
| 2,955,088 | 10/1960 | Beerbower | 204—154 |
| 3,002,910 | 10/1961 | Caffrey | 204—154 |
| 3,012,953 | 12/1961 | Greenwald et al. | 204—154 |
| 3,058,896 | 10/1962 | Nahin | 204—154 |
| 3,092,560 | 6/1963 | Reiter | 204—154 |
| 3,092,588 | 6/1963 | Jones et al. | 252—432 |

OTHER REFERENCES

Nucleonics 19, No. 2, February 1961, pages 70, 72.

REUBEN EPSTEIN, *Primary Examiner.*